United States Patent [19]

Doi et al.

[11] 4,190,707

[45] Feb. 26, 1980

[54] ALKALINE BATTERY SEPARATOR

[75] Inventors: Yoshinao Doi, Kawasaki; Mitsuo Kohno, Yokohama; Katsumi Yoshitake, Yokosuka, all of Japan

[73] Assignee: Asahi Kasei Kogyo Kabushiki Kaisha, Osaka, Japan

[21] Appl. No.: 948,162

[22] Filed: Oct. 3, 1978

[30] Foreign Application Priority Data

Oct. 3, 1977 [JP] Japan .............................. 52-117860

[51] Int. Cl.$^2$ ........................................... H01M 2/16
[52] U.S. Cl. ...................................... 429/254; 264/49
[58] Field of Search ...................... 429/254, 249, 206

[56] References Cited

U.S. PATENT DOCUMENTS

| | | | |
|---|---|---|---|
| 2,676,929 | 4/1954 | Duddy | 429/254 |
| 2,700,694 | 1/1955 | Fernald | 429/254 |
| 3,045,058 | 7/1962 | Martinak | 429/254 |
| 3,351,495 | 11/1967 | Larsen et al. | 136/146 |
| 3,536,796 | 10/1970 | Rock | 264/49 |
| 3,558,764 | 6/1971 | Isaacson | 264/210 |

*Primary Examiner*—Donald L. Walton
*Attorney, Agent, or Firm*—Armstrong, Nikaido, Marmelstein & Kubovcik

[57] ABSTRACT

An alkaline battery separator made of a porous film which consists substantially of a polyolefin having a weight average molecular weight of less than 300,000 and a number average molecular weight of 15,000 or more and which has a thickness of 0.025 to 1 mm, a porosity of 50 to 80%, an average pore diameter of 0.05 to 0.5$\mu$ and an average ratio of the larger dimension to the smaller dimension of the pore opening of not more than 2. The alkaline battery separator has not only an extremely low electrical resistance and a high alkali resistance but also a transmission-inhibitive ability for the active materials of battery and is excellent in mechanical strength and flexibility. It does not show appreciable shrinkage by heat. For producing such an alkaline battery separator, 10 to 50 volume percent of a polyolefin, 7 to 42 volume percent of an inorganic filler and 30 to 75 volume percent of an organic liquid having a solubility parameter of from 8.6 to 9.9 inclusive are blended, the amount of the polyolefin being 2/3 to 9 multiple of the amount of the inorganic filler, and the resulting blend is subjected to melt-molding to form a film, followed by extraction of the organic liquid and the inorganic filler from the film. In the extraction of the organic liquid and the inorganic filler, the film does not undergo shrinkage to provide a separator having excellent characteristics.

36 Claims, No Drawings

ALKALINE BATTERY SEPARATOR

This invention relates to a battery separator, and more particularly to an alkaline battery separator made of a porous film which consists substantially of a polyolefin and which has not only an extremely low electrical resistance and an excellent alkali resistance but also a transmission-inhibitive ability for the active materials of battery and the like and is excellent in mechanical strength and flexibility or pliability. The present invention is also concerned with a method of producing a battery separator of the character mentioned above.

The term "alkaline battery separator" is used to include batteries employing as an electrolytic liquid an aqueous alkaline solution such as primary batteries, e.g. an alkali-manganese cell, a mercury cell, a silver oxide cell and the like; and a secondary battery, e.g. a Ni-Cd accumulator, a Ni-Fe accumulator, a silver oxide accumulator and the like. The battery separator of the present invention can be advantageously used in such alkaline batteries and exhibits excellent properties. The battery separator can also be used in other kinds of batteries employing as an electrolytic liquid an organic solvent. The manner in which the battery separator of the present invention is used is varied according to the kind and the size of the battery. In general, the battery separator of the present invention may be used alone or in the form of a laminate thereof with a cellophane, a nylon cloth, a nonwoven nylon fabric or the like. Illustrative examples of the manner of actual use of the battery separator of the present invention are (1) the separator is disposed, in a flat form, between the positive and negative electrodes of the battery in a sandwich manner; (2) in a battery of the type in which a plurality of electrodes are disposed with the positive electrodes and negative electrodes being alternatingly arranged, the separator runs zigzag so that it is disposed in each of the spacings between the electrodes and their respective adjacent electrodes; and (3) the separator is wound in mutiple layers around one electrode to separate the electrode from the other electrode disposed outside the periphery of the wound separator.

The required properties for the battery separators to be used in such various manners as mentioned above are varied, with respect to thickness and the like, according to the kind and the size of the alkaline battery, but the generally required properties for the separator irrespective of the kind and the size of the alkaline battery can be mentioned as follows:

(1) It should have a good resistance to chemicals, i.e. alkaline electrolytic liquid;

(2) It should have a low electrical resistance;

(3) The pore size of it is so small that the particles of the active materials and the like cannot be transmitted therethrough so as not to cause short-circuiting;

(4) It should have a large mechanical strength and an excellent flexibility or pliability;

(5) It should have so high a thermal stability that it exerts a sufficient performance as the battery separator even at high temperatures;

(6) It should not liberate, by dissolution, substances harmful to the battery;

(7) The permeability of it to the electrolytic liquid is excellent; and the like.

As the battery separator satisfying such requirements, there has generally been employed a cellophane in the art. The cellophane is, in fact, capable of preventing transmission of the active materials and the like at the initial stage of the use of it in the battery, but it tends to be gradually gellation-swollen by the action of the electrolytic liquid, leading to decrease of the transmission-inhibitive ability for the active materials and the like. For this reason, the cellophane has a restriction on its use as a battery separator, especially, for alkaline secondary batteries which are generally required to be durable for a period of time as long as about 10 to 15 years.

Accordingly, there has recently been a serious demand for improved alkaline battery separators having excellent properties which meet all the above-mentioned requirements.

With a view to realizing such improved alkaline battery separators, there have heretofore been made many attempts to provide battery separators made of porous films of polyolefin resins having excellent resistances to alkali. The conventionally proposed polyolefin type porous films include, for example:

(a) a porous film prepared by sintering polyethylene powders;

(b) a porous film prepared by melt-stretching polypropylene, followed by annealing, and subjecting the resultant to monoaxial cold stretching (see, for example, U.S. Pat. No. 3,558,764);

(c) a porous film prepared by blending a polyolefin having a weight average molecular weight of at least 300,000 and a standard load melt index of 0 (zero), silica and a petroleum oil and subjecting the resulting blend to melt-molding to form a sheet, followed by successive extractions of the petroleum oil and the silica from the sheet (see, for example, U.S. Pat. No. 3,351,495); and (d) a porous film prepared by blending a polyolefin and hemihydrated calcium sulfite crystals having a particle size of 1 to 100μ, subjecting the resulting blend to melt-molding to form a sheet and stretching the sheet, followed by extraction of the hemihydrated calcium sulfite (see, for example, Japanese patent application laid-open specification No. 22472/1974).

Any of these conventional porous films, however, is still insufficient for use as an alkaline battery separator. Illustratively stated (the porous films of the following characters (a) to (d) correspond to those identified above by the same characters):

(a) the pore size of the porous film is as large as several ten microns so that the film is deficient in transmission-inhibitive ability for the active materials. Moreover, the porous film has a poor breaking strength and therefore is brittle and poor in pliability. For this reason, it is difficult to form a film as thin as less than 0.4 mm so that the film is not suitable for use as a battery separator requiring a low electrical resistance;

(b) the porous film is produced by two-step monoaxial stretching and hence, contrary to the situation in (a) above, the film is forcibly to be as extremely thin as about 25μ. The pores of the film, however, do not form a network structure having meandering passages composed of the pores but rather have a simple structure in which there are pores running straightly in a thickness-wise direction and having an average ratio of the longitudinal or larger dimension to the lateral or smaller dimension of the openings of pores of about 10/1. For this reason, as compared with the porous films of a network structure, the film is poor in transmission-inhibitive ability for the active materials, dendrites growing on the positive electrode and the like. Furthermore, the film is exceedingly oriented in the longitudinal direction by the monoaxial stretching and hence, the film has such disadvantages that it is liable to be torn in the longitudinal direction and that it undergoes heat shrinkage as large as more than 10%;

(c) the porous film is originally intended to be used as a lead-acid battery separator in the form of a semi-extracted porous film from which only the petroleum oil is extracted. When the semi-extracted porous film is further subjected to extraction of the silica, the film inevitably undergoes shrinkages of about 20 to 30% respectively in longitudinal, lateral and thicknesswise directions, causing large increase in electrical resistance. In addition, the film thus obtained is poor in flatness. Accordingly, the porous film is not suitable for use as an alkaline battery.

In this connection, it is noted that the new method has been proposed for reducing shrinkage in the extraction of the silica. According to the proposed method, after the extraction of the petroleum oil, the resultant wet extracted film is subjected, without being dried, to extraction of the silica (see U.S. Pat. No. 3,536,796). Even by this proposed method, the extraction of the silica is inevitably accompanied by shrinkage of the film of about 7 to 8% in each of the longitudinal, lateral and thicknesswise directions, leading to increase in the electrical resistance of the final product film. Moreover, for example, for extracting the petroleum oil and the calcium carbonate, the method is required to involve many complicated extraction steps including successive changes of solvents, that is, hexane→acetone-hexane acetone→water-acetone →hydrochloric acid→water-→aqueous potassium hydroxide solution. Therefore, the method is not industrially practical. Further, according to this proposed method, since there is employed such a poor flowability high molecular weight polyolefin as has a weight average molecular weight of at least 300,000 and a standard load melt index of 0 (zero), a thin film-forming ability is poor so that it is difficult to obtain a film as thin as less than 0.2 mm; and (d) the pores of the porous film are coarse and have diameters as large as more than $0.5\mu$. In addition, despite its high porosity, the opening areas of the pores are so small that the electrical resistance of the film is high. Further, since the film is formed by stretching, it is naturally liable to undergo shrinkage by heat.

As described, any of the conventional techniques, except for the technique of (b) above, cannot provide such a polyolefin porous film having not only a microporosity but also a low electrical resistance as is practically acceptable as an alkaline battery separator. Also with respect to the porous film obtained by the technique of (b) above, since it has disadvantages as mentioned above and is expensive, there is still a problem for putting it in a practical use.

Besides the above-mentioned techniques, there is also known a technique concerning a porous film comprising a polyolefin and an inorganic filler such as silica, calcium carbonate or the like. Such a porous film, however, often contains an alkali-soluble inorganic filler. When such a porous film is employed as an alkaline battery separator, the inorganic filler is readily dissolved into the electrolytic liquid, causing the battery to be deteriorated.

Accordingly, it is an object of the present invention to provide an alkaline battery separator made of a porous film which has not only an extremely low electrical resistance but also a high alkali resistance.

It is another object of the present invention to provide an alkaline battery separator made of a porous film of the character described, which has an excellent transmission-inhibitive ability for the active materials of batteries and is excellent in mechanical strength as well as flexibility or pliability.

It is still another object of the present invention to provide an alkaline battery separator of the above character, which has extremely reduced shrinkage and further is excellent in dimensional stability so that it does not undergo appreciable shrinkage by exposure to heat and/or alkaline conditions.

It is a further object of the present invention to provide a method of producing an alkaline battery separator of the kind described above, which is simple in operation and can be conducted with high reproducibility.

The forgoing and other objects, features and advantages of the present invention will be apparent to those skilled in the art from the following detailed description and appended claims.

In one aspect of the present invention, there is provided an alkaline battery separator made of a porous film which consists substantially of a polyolefin having a weight average molecular weight of less than 300,000 and a number average molecular weight of 15,000 or more and which has a thickness of 0.025 to 1 mm, a porosity of 50 to 80%, an average pore diameter of 0.05 to $0.5\mu$, an average ratio of the larger dimension to the smaller dimension of the pore opening of not more than 2 and an electrical resistance of 0.00005 to 0.0005 $\Omega$ dm$^2$/0.1 mm.

In another aspect of the present invention, there is provided a method of producing an alkaline battery separator made of a porous film which comprises blending a polyolefin having a weight average molecular weight of less than 300,000 and a number average molecular weight of 15,000 or more, an inorganic filler, and an organic liquid having a solubility parameter ranging from 8.6 to 9.9 inclusive in amounts of 10 to 50 volume percent, 7 to 42 volume percent, and 30 to 75 volume percent, respectively, based on the whole volume of the polyolefin-filler-organic liquid composition, the amount of the polyolefin being ⅔ to 9 multiple of the amount of the inorganic filler; subjecting the resulting blend to melt-molding to form a film; and extracting from said film the organic liquid and the inorganic filler.

The most important characteristic feature of the present invention is in the materials employed. According to the present invention, there should be employed a polyolefin having a weight average molecular weight (Mw) of less than 300,000, preferably 250,000 or less, more preferably 85,000 to 250,000 and a number average molecular weight (Mn) of 15,000 or more, preferably 17,000 or more, more preferably 17,000 to 50,000. There may be employed a polyolefin having a standard load melt index of 0.01 or more, preferably 0.03 to 1. By the use of such specific polyolefin, it is possible to form a flexible thin film having a thickness ranging from 0.025 to 1 mm. In contrast, when a polyolefin having a number average molecular weight of less than 15,000 is employed, a porous material obtained is poor in stretchability and brittle. Whereas, in case a polyolefin having a weight average molecular weight of 300,000 or more is employed, there are caused problems with respect to moldability because of its poor flow characteristics in the molten state and with respect to electrical resistance of the film produced therefrom because, when molded, the obtained film has a molding strain therein due to the poor flowability of the polyolefin and hence, in the extraction of the inorganic filler the film undergoes large shrinkage, so that not only the porosity is lowered but also the average pore diameter is reduced, which leads to decrease in the overall opening area in the film.

The term "polyolefin" used herein is intended to include homopolymers and copolymers of olefins and include, for example, polyethylene, polypropylene, polybutene, copolymers of at least two members selected from ethylene, propylene, butene and hexene, and mixtures thereof so long as they have a weight average molecular weight of less than 300,000 and a number average molecular weight of 15,000 or more. Of these resins, polyethylene or a copolymer of ethylene as a main component with other olefin is most preferable.

The inorganic filler employed serves to carry the organic liquid in the course of molding of the film, retaining the organic liquid to facilitate the molding. Although the inorganic filler is extracted at the final step of the method of the present invention, it also serves to impart good porosity to the film, as will be explained later. The filler is preferably finely divided particles or porous particles having an average particle diameter ranging from 0.005 to 0.5μ and a specific surface area of 50 to 500, preferably 150 to 400 m²/g. It is preferred to employ such an inorganic filler that it is capable of adsorbing thereon the organic liquid in an amount of at least its ⅔ multiple by volume, preferably its 3 multiple by volume, and maintaining its powdery or granular form.

As specific examples of the inorganic fillers, there can be mentioned silica, calcium silicate, magnesium silicate, magnesium oxide, calcium carbonate, magnesium carbonate, magnesium sulfate, sodium chloride, kaolin clay, pulverized talc, titanium oxide, diatomaceous earth, sugar, etc. They may be employed alone or in combination. Of the above-mentioned fillers, silica is especially preferred because of its low cost, large adsorption capacity for an organic liquid and good solubility for an aqueous alkali solution to be used as one of the filler solvents, but the filler is of course not limited thereto.

The organic liquid employable in the present invention is preferably to keep a liquid state at the time of molding, the readily soluble in general organic solvents or water and be easily extractable from the molded film. The organic liquid is selected from those having a solubility parameter (SP) of 8.6 to 9.9, preferably from 8.7 to 9.4. The "solubility parameter" is a parameter which is used to assess the solubility of polymers in solvents by H. Burrell and B. Immergut in "Polymer Handbook" (1966), Part IV, page 34 onwards.

When an organic liquid having an SP value of 8.6 to 9.9 is employed, an appropriate amount of the organic liquid is dissolved into the polyolefin resin and most of the organic liquid is adsorbed on the surface portion of the inorganic filler. As a result, there is obtained a polyolefin-inorganic filler - organic liquid composition which has an excellent moldability and an extractability and is capable of forming a porous film which has a high mechanical strength and a low electrical resistance by extraction of the organic liquid and the inorganic filler. When an organic liquid having an SP value of more than 9.9, such as dimethyl phthalate (10.5), polyethylene glycol (10.5) or the like is employed, the solubility of the organic liquid in the polyolefin is lowered, so that in molding the organic liquid tends to be readily liberated from the polyolefin. This leads to prevention of mutually-dissolved association of component polymers, rendering the moldability of the polyolefin composition poor. At the same time, the pores of the web structure of the porous film to be formed from the composition tend to be coarse and the average pore diameter will become as large as more than 0.5μ. Hence, the mechanical strength and elongation of the porous film will be lowered and the transmission-inhibitive ability for the active materials of batteries is also decreased.

On the other hand, when an organic liquid having an SP value of less than 8.6, the amount of the organic liquid dissolved into the polyolefin resin is increased, so that the mutually-dissolved association of the component polymers is increased, thus improving moldability of the composition and mechanical strengths of the porous film to be formed therefrom. On the other hand, however, the pore-forming property is deteriorated and hence, the desired porous film will have extremely small pores of an average pore diameter of less than 0.025μ. Further, when the organic liquid is extracted from the polyolefin composition in which the polyolefin has been dissolved and swollen by such organic liquid with such a small SP value, the attractive force is exerted between the molecules of the polyolefin resin. So, the film tends to shrink, but since there are present inorganic fillers, shrinkage of the film does not occur, keeping the film under stress. If the inorganic filler is extracted from the film under such stress, the film is forcibly caused to shrink with a shrinkage of more than 6% in terms of average value of shrinkages in longitudinal, lateral and thicknesswise directions, so that the porosity of the desired film is unfavorably lowered, leading to increase in the electrical resistance of the porous film. At the same time, due to the non-uniform shrinkage, the film is caused to have a convexed and concaved surface, leading to poor appearance.

According to the present invention, as described, by the use of an organic solvent having an SP value of 8.6 to 9.9 and an inorganic filler as well as a polyolefin having a weight average molecular weight of less than 300,000 and a number average molecular weight of 15,000 or more, when the inorganic filler is extracted from the semi-extracted film from which the organic solvent has been extracted, the extraction of the filler can be easily, shortly accomplished without causing appreciable shrinkage, thereby to provide a porous film in which the polyolefin constitutes a web structure defining a network of pores forming meandering passages communicating from one surface of the film to the opposite surface thereof, said pores having an average pore diameter (as defined before) of 0.05 to 0.5μ.

Representative examples of the organic liquid having an SP ranging from 8.6 to 9.9 inclusive are phthalic acid esters such as diethyl phthalate (DEP), dibutyl phthalate (DBP), and dioctyl phthalate (DOP); trimellitic acid esters such as trioctyl trimellitate (TOTM); phosphoric acid esters such as tributyl phosphate (TBP), octyl diphenyl phosphate; and the like.

Illustrative explanation will now be given on the method of producing an alkaline battery separator made of a porous film according to the present invention. 10 to 50 volume percent, preferably 15 to 40 volume percent of a polyolefin, 7 to 42 volume percent, preferably 10 to 20 volume percent of an inorganic filler and 30 to 75 volume percent, preferably 50 to 70 volume percent of an organic liquid having an SP of from 8.6 to 9.9 inclusive are blended, the amount of the polyolefin being ⅔ to 9 multiple of the amount of the inorganic filler, and the resulting blend is subjected to melt-molding to form a film, followed by extraction of the organic liquid and the inorganic filler from the film.

In practicing the method of the present invention, where the amount of the filler employed is less than 7 volume percent, it is impossible to adsorb the organic liquid in an amount sufficient for obtaining the desired porous film and the blend is difficult to keep it at a powdery or granular state so that it is difficult to effect molding of the blend. Whereas, in case the amount of the filler employed is more than 42 volume percent, the blend is poor in flowability in molding and the molded product is brittle and cannot be put in practice. Where the amount of the organic liquid is less than 30 volume percent, a sufficient pore-forming ability due to the organic liquid is reduced, so that an effectively porous film cannot be obtained. On the other hand, where the amount of the organic liquid employed exceeds 75 volume percent, the blend is difficult to mold so that a porous film having an excellent mechanical strength cannot be obtained. Where the amount of the polyolefin employed is less than 10 volume percent, the blend is poor in moldability and the porous film to be formed therefrom is poor in mechanical strength because of the less amount of the polyolefin. Whereas, in case the amount of the polyolefin exceeds 50 volume percent, there can hardly be obtained a porous film having a desired high porosity.

As described, the blend to be used for producing a porous film of the present invention is substantially a three-component system of polyolefin-inorganic filler-organic liquid. However, there may be incorporated additives such as an antioxidant, an auxiliary agent for molding and the like in such an amount range that the additives do not spoil the desired properties of the porous film.

The blending of the components may be effected using an ordinary mixer such as a Henschel mixer, a V-shaped, tumbler, a ribbon blender or the like. The conditions of the above blending vary slightly according to kind and rotation speed of the mixer used, but usually the blending is accomplished at room temperature for about one minute. The above-mentioned blending of three components may be effected in one-stage, but a two-stage blending is rather recommendable. Illustratively stated, based on the total volume of a polyolefin, an inorganic filler and an organic liquid, 7 to 42 volume percent inorganic filler and 30 to 75 volume percent organic liquid are blended to adsorb the organic liquid onto the surface of the filler particles, and a polyolefin is then mixed with the above obtained blend in an amount of 10 to 50 percent by volume but ⅔ to 9 multiple by weight based on the inorganic filler. When the two-stage blending is employed, good handling characteristics and excellent dispersion of the components can be attained, thereby improving not only melt-moldability of the blend but also porosity and mechanical strength of the porous film to be formed therefrom.

The resulting polyolefin-filler-organic liquid blend is kneaded by a kneading machine such as an extruder, a Banbury mixer, a mixing twin roll, a kneader, etc. The so kneaded material is subjected to molding to form a film having a thickness of 0.025 to 1 mm. Typical examples of the molding are extrusion molding employing a T-die or inflation method, calender molding, compression molding, injection molding, etc. The T-die extrusion molding is especially preferable to form a film as thin as 0.025 to 0.3 mm. The molding may be effected under molding conditions such as ordinarily employed in molding of polyolefins as far as the molding is effected at a temperature higher than the melting point of the polyolefin employed and below the boiling point of the organic liquid employed.

The kneading step as described above is optional in the method of the present invention. Particularly, when there is employed an extruder, a kneader-extruder in which the kneading is conducted simultaneously with molding, the separate step for kneading is not necessary. But when the kneading step is positively employed, the bulk density of the blend can be appropriately controlled and, at the same time, good dispersion of the components can be attained, leading to improvement of handling characteristics and reduction of pin holes of the product film. Such reduction of pin holes is particularly important for an alkaline battery separator.

The organic liquid is extracted from the molded film at a temperature below a melting point of the polyolefin by a solvent for the organic liquid employed. The solvent employable for extracting the organic liquid from the molded film is selected from those capable of dissolving the organic liquid but not dissolving the polyolefin used. Representative examples of the solvent to be employed for extracting the organic liquid include alcohols such as methanol, ethanol and iso-propanol; ketones such as acetone; chlorine-substituted hydrocarbons such as trichloroethylene and 1,1,1-trichloroethane; and the like. The extraction of the organic liquid from the molded film may be conducted employing various methods ordinarily employed in the art, for example, batch type dipping method, counter-flow method and the like.

According to the present invention, it is not necessary to remove by extraction all of the organic liquid used and there may remain in the film the organic liquid. However, if the extraction is not effected sufficiently, the porosity is naturally lowered, which is of course undesirable to the film as the battery separator. The acceptable residual rate of the organic liquid is generally 3 or less volume percent, preferably 2 or less volume percent based on the film.

The extraction of the organic liquid can be accomplished shortly, i.e., for a few minutes.

After extraction of the organic liquid, the extraction of the inorganic filler is subsequently done. In this instance, the wet semi-extracted film from which the organic liquid has been extracted may be subjected, as such or after being dried, to extraction of the inorganic filler. When the semi-extracted film is subjected to drying, the drying may be effected at temperatures which are at least 20° C. lower than the melting point of the polyolefin employed, usually at 70° to 105° C., so that the solvent may be advantageously recovered without causing shrinkage of the film. The drying may be conducted, under atmospheric pressure or reduced pressure, using an ordinary drying method by heated air, a hot roll or the like.

The extraction of the inorganic filler may be easily done, using a solvent therefor, in the same manner as described with respect to the extraction of the organic liquid. As the extraction solvents for the inorganic fillers, acids such as hydrochloric acid, sulfuric acid, hydrofluoric acid and the like may be used for calcium carbonate, magnesium carbonate, calcium silicate, magnesium silicate, titanium oxide, magnesium oxide and the like. For silica, aqueous solutions of alkalis such as sodium hydroxide, potassium hydroxide and the like may advantageously be employed. Water can be employed for extracting magnesium sulfate, sodium chloride, sugar and the like. The concentration of the solvent is not critical, and in general, there may be employed a solvent having a concentration of about 1 to 80% by weight. Taking into consideration the extraction ability and viscosity of the solvent, those of a concentration of about 10 to 50% by weight may preferably be employed. The extraction of the inorganic filler may be conducted at room temperature to temperatures that are at least 20° C. lower the melting point of the polyolefin employed, usually at 20° to 105° C. The extraction of the inorganic filler can be accomplished in a few minutes to 24 hours, but from an industrial viewpoint, it is advantageous to complete extraction of the inorganic filler in a period of time of 30 minutes or less. The suitable kind, concentration and temperature of the solvent is determined according to the kind of the inorganic filler to be employed. As mentioned above, the extraction of the inorganic filler may be conducted in the same manner as employed for the extraction of the organic liquid, that is, according to a batch type dipping method, counter-flow method and the like. Further, in order to increase the rate of extraction, agitation and/or supersonic wave may advantageously be applied.

The above-mentioned extraction of the organic liquid and the inorganic filler is effected in two-stage, but instead there may be employed a one-stage extraction operation so that the organic liquid and the inorganic filler can be accomplished at a time without any disadvantage. For this purpose, a suitable solvent should be chosen. For example, in order to extract dioctyl phthalate and silica simultaneously, a solution of sodium hydroxide or potassium hydroxide in an alcohol may be effectively employed.

When only the organic liquid has been extracted in the first stage of the above-mentioned two-stage extraction process, there is obtained a so-called semi-extracted film or a microporous film in which the inorganic filler still remains unextracted and a small part of the organic liquid may optionally remain unextracted in an amount of not more than 3 volume percent based on the microporous film, the volume percent of the organic liquid being calculated using the true specific gravity of the microporous film as the basis for the calculation. The thus obtained microporous film comprises 40 to 88 volume percent of a polyolefin having a weight average molecular weight of less than 300,000 and a number average molecular weight of 15,000 or more and 60 to 12 volume percent of an inorganic filler and has a void space rate of 30 to 75 volume percent based on the volume of the film. The volume percent of the polyolefin may more preferably be 50 to 80, most preferably 60 to 70. The volume percent of the inorganic filler may more preferably be 50 to 20, most preferably 40 to 30. The void space rate may more preferably be 45 to 65 volum percent based on the microporous film. The microporous film has such a structure that the polyolefin constitutes a web structure and there are formed, in net work, pores defined by the polyolefin web structure and containing therein the filler attached thereto, leaving a space forming a path communicating from one surface of the film to the opposite surface of the film. The term "void space" used herein means a space left in the pore and formed by cooperation between the particles of filler contained therein and cooperation between the wall of the pore and the particles of filler contained therein. The term "void space rate" used herein is intended to mean a volume rate of the void spaces formed in the overall structure of the microporous film. The average diameter of the opening portion of the void space is as small as 0.01 to 0.1$\mu$. The semi-extracted microporous film has a thickness of 0.025 to 1 mm. Such a microporous film obtained by the extraction of only the organic liquid, as such or after dried, may be stored and/or transported to other places without undergoing any unfavorable change such as shrinkage or quality deterioration, and at any time, the semiextracted film may be subjected to extraction of the inorganic filler to provide an alkaline battery separator having excellent characteristics. Accordingly, in a further aspect of the present invention, there is provided a method of producing an alkaline battery separator which comprises extracting the inorganic filler from a microporous film comprising 40 to 88 volume percent of a polyolefin having a weight average molecular weight of less than 300,000 and a number average molecular weight of 15,000 or more and 60 to 12 volume percent of an inorganic filler and having a void space rate of 30 to 75 volume percent based on the volume of the film. As described, the semi-extracted microporous film comprising a specific polyolefin having a weight average molecular weight of less than 300,000 and a number average molecular weight of 15,000 or more and an inorganic filler has an excellent dimensional stability and can advantageously be, in the form as such or in the form as dried, easily handled, stored and/or transported and then subjected to the subsequent extraction of the inorganic filler at any time and/or in any place to obtain a desired alkaline battery separator.

After the extraction of the inorganic filler, there may remain in the film the inorganic filler in such an amount as not to spoil the desired properties of the porous film. The acceptable residual amount of the inorganic filler is 3 volume percent or less, preferably 2 volume percent or less based on the film.

After completion of the extraction of the inorganic filler, the porous film thus obtained may optionally be washed with water, an alcohol, a ketone or the like, and dried. The drying of the porous film may be easily conducted in the same manner as described with respect to the drying of the so-called semi-extracted film from which only the organic liquid has been extracted.

In the porous film of the present invention, there may be incorporated a surface active agent such as hydroxyethylenehydroxypropylene block copolymer, sodium alkylbenzene sulfonate or the like, so as to impart good wettability to the porous film. Such a surface active agent may be incorporated in an amount such as not to spoil the desired properties of the porous film, usually in an amount of not more than 10% by weight based on the film.

Remarkable advantages of the present invention reside in minimized shrinkage in extracting the organic liquid and the inorganic filler. In the known techniques, there often occurs shrinkage as large as 20 to 30%, or complicated procedures are conducted for reduction of shrinkage. According to the present invention, however, by the use of a specific polyolefin having a weight average molecular weight of less than 300,000 and a number average molecular weight of 15,000 or more and a specific organic liquid having an SP value of 8.6 to 9.9, it becomes possible to minimize shrinkage of the film at the time of extracting the organic liquid as well as the inorganic filler, thereby enabling an alkaline battery separator having a high porosity and an extremely low electrical resistance to be obtained. Illustratively stated, according to the present invention, the shrinkage of the film at the time of extracting the organic liquid is not more than 4%, usually not more than 3% and the shrinkage of the film at the time of extracting the inorganic filler is not more than 6%, usually not more than 4%. The shrinkage at the time of the extraction is expressed in terms of an average value of the shrinkages respectively in the longitudinal, lateral and thicknesswise directions of the film.

Thus, according to the present invention, there is provided an excellent battery separator made of a specific porous film. As described, the specific film of the present invention is characterized in that it consists substantially of a polyolefin having a weight average molecular weight of less than 300,000 and a number average molecular weight of 15,000 or more and that it has a porosity of 50 to 80%, preferably 55 to 75%, an average pore diameter of 0.05 to 0.5μ, preferably 0.08 to 0.3μ, and an average ratio of the larger dimension to the smaller dimension of the pore opening of not more than 2, preferably not more than 1.5. The porous film has a web structure defining a network of pores forming meandering passages communicating from one surface of the film to the opposite surface thereof. Due to such a specific structure as mentioned above, the battery separator made of the porous film has an electrical resistance as extremely low as 0.00005 to 0.0005 Ω dm$^2$/0.1 mm. Furthermore, the complicated network of pores of the porous film is capable of well inhibiting, not only at its surface portions but also at its internal complicated pore structure, transmission of the active materials of battery and the like, as compared with the known porous film in which the pores run straightly along the thicknesswise direction of the film.

When the battery separator of the present invention is employed in an alkaline battery, the discharge voltage of the battery can be favorably maintained at a high level due to the low electrical resistance of the separator, thereby enabling the battery not only to exert a high performance but also to be compact in size. The cellophane-made separator and the separator made of the polypropylene porous film formed by stretching which are conventionally employed as the alkaline battery separator have electrical resistances of 0.002 Ω dm$^2$/0.1 mm and 0.0012 Ω dm$^2$/0.1 mm, respectively. It is apparent that the alkaline battery separator of the present invention has a low electrical resistance as 1/10 to 1/100 as that of the cellophane-made separator and as ½ to 1/20 as that of the polypropylene-made separator, and exhibits an extremely excellent performance.

Moreover, due to the excellent transmission-inhibitive ability for the active materials of battery, the present battery separator is capable of well preventing short-circuiting in the alkaline battery, so that the life of the alkaline battery can be remarkably prolonged without lowering of the performance of the battery.

The battery separator of the present invention has a high alkali resistance. For example, even after the present alkaline battery separator is immersed in a 40% aqueous solution of potassium hydroxide at 80° C. for 1 week, it shows a minimized weight decrease and a dimensional stability.

The battery separator of the present invention is also excellent in heat shrinkage. For example, even after a sample (10 cm × 10 cm) of the present battery separator is immersed in an aqueous potassium hydroxide solution having a specific gravity of 1.3 at 105° C. for 30 minutes, the heat shrinkage of the separator is as low as not more than 6%, usually not more 4%. The heat shrinkage is expressed in terms of a maximum value of the shrinkage respectively measured with respect to longitudinal, lateral and thicknesswise directions of the sample. In use, the alkaline battery separator is often exposed to high temperature conditions such as about 80° to 100° C. If the heat shrinkage of the separator exceeds 6%, the separator is occasionally caused to tightly wind round the electrode and broken by the edge portion of the electrode and the like, leading to a fear of short-circuiting of the battery.

As described, the battery separator of the present invention has a thickness of 0.025 to 1 mm. When the present battery separator is used in the form of multiple layers wound round the electrode or used in an extremely smallsize type battery such as a silver battery, it is preferred to employ a porous film having a thickness as thin as 0.03 to 0.3 mm, preferably 0.05 to 0.10 mm.

Throughout the specification and claims, all "volume percents" including those of the residual amounts of organic liquid and inorganic filler are given in terms of calculation data obtained by using a true specific gravity as the basis for the calculation.

The present invention will now be described in detail by reference to the following Examples that by no means limit the scope of the present invention.

The properties shown herein were measured in the following method.
Weight average molecular weight ($\overline{Mw}$):
Number average molecular weight ($\overline{Mn}$):
  GPC measuring apparatus; Model 200 manufactured by Waters Assoc. Co., U.S.A.
  Column; G 700S-G 3000S manufactured by Toyo Soda Kogyo K.K., Japan
  Solvent: trichlorobenzene
  Measuring temperature; 135° C.
Viscosity average molecular weight ($\overline{Mv} \approx \overline{Mw}$):
  Measured by using decalin at a temperature of 135° C.
  $[\eta] = 6.20 \times 10^{-4} \overline{Mv}^{0.70}$ (Formula of Chiang)
  The average molecular weight of polyethylene having SLMI of 0 was measured according to this method and then calculated.
Composition ratio (volume percent): Calculated from the value obtained by dividing the amounts of the respective materials charged by their respective true specific gravities.
Porosity (%):
  Pore volume/film volume × 100
  Pore volume = weight of water-saturated film — weight of dry film)
Average pore diameter ($\mu$): Weighted average calculated from the averages of the larger and smaller dimensions of the openings of 200 pores appearing on the surface of the film in a scanning electron photomicrograph of the surface of the porous film
Average ratio of the larger dimension to the smaller dimension of the pore opening: Average of the ratios measured and calculated with respect to the openings of 200 pores employed for determining "Average pore diameter" defined above
Specific surface area (m$^2$/g): Measured according to BET absorption method
Breaking strength (kg/cm$^2$) and Breaking elongation (%): Measured substantially according to ASTM-D-882 using an Instron type tension tester (an initial strain rate = 2.0 mm/mm·min.)

Electrical resistance ($\Omega \text{dm}^2$/sheet, $\Omega \text{dm}^2$/0.1 mm): Measured using an aqueous potassium hydroxide solution having a specific gravity of 1.3 and a pure nickel plate as electrodes according to JIS-C-2313

Heat shrinkage (%): Maximum value of the shrinkages respectively measured with respect to the longitudinal, lateral and thicknesswise directions after a sample (10 cm × 10 cm) of the film has been immersed in an aqueous potassium hydroxide solution (specific gravity = 1.3) at 105° C. for 30 minutes Melt index (SLMI):
Measured according to ASTM-D-1238-65T
Condition E (with respect to polypropylene, Condition L applied)

Solubility parameter (SP): Calculated by the formula of P. A. Small $$(d\Sigma G)/M$$

wherein
G: molar attraction constant
d: specific gravity
M: molecular weight

EXAMPLE 1

13.6 Volume percent of NIPSIL VN-3 [trade name of finely divided silica manufactured and sold by Nippon Silica Industrial Co., Ltd., Japan (specific surface area: 280 m²/g, average diameter of particles: 16 mμ)] and 60.8 volume percent of dioctyl phthalate [DOP (SP: 8.9)] were mixed in a Henschel mixer and further mixed with 25.6 volume percent of SUNTEC S-360 P [trade name of polyethylene manufactured and sold by Asahi Kasei Kogyo Kabushiki Kaisha, Japan ($\overline{M}w = 85,000$, $\overline{M}n = 21,000$, SLMI = 1)] in this mixer.

By a twin extruder having a diameter of 30 mm, the blend was kneaded, extruded and pelletized. These pellets were extruded to form a film using an extruder having a T-die of 450 mm width attached thereto, at an extruding rate of 12.5 kg/hr, an extruding speed of 2 m/min and a resin pressure of 65 kg/cm².

The extruded film was immersed in CHLOROTHENE VG (trade name of 1,1,1-trichloroethane manufactured and sold by Asahi Dow Ltd., Japan) for 5 minutes to extract DOP, followed by drying at 85° C. for 2 minutes by the use of a metal roll with a flannel wound therearound. Subsequently, the film was immersed in a 40% aqueous solution of sodium hydroxide at 50° C. for 30 minutes to extract the finely divided silica, followed by drying at 85° C. for 10 minutes by the use of a metal roll with a flannel wound therearound. The amounts of the DOP and the finely divided silica remaining unextracted from the film were 0.2 volume percent and 0.1 volume percent based on the volume of the film, respectively. The shrinkages of the film due to the extraction of DOP were 1.2% in a longitudinal direction (direction of extrusion), 1.0% in a lateral direction and 0.8% in a thicknesswise direction. The shrinkages of the film due to the extraction of the finely divided silica were 2.3% in a longitudinal direction, 1.3% in a lateral direction and 1.0% in a thicknesswise direction.

The porous film thus obtained had a thickness of 0.190 mm and a porosity of 68%. There were observed about $6 \times 10^8$ pores per cm² which pores had an average pore diameter of 0.12μ. The average ratio of the longitudinal or larger dimension to the lateral or smaller dimension of the pores was 1.1, and the maximum pore diameter was 0.3μ. The electrical resistance of this porous film as measured in an aqueous potassium hydroxide solution having a specific gravity of 1.30 was as extremely low as 0.00020 $\Omega \text{dm}^2$/sheet (0.00011 $\Omega \text{dm}$/0.1 mm).

When the porous film was dipped in a 40% aqueous solution of potassium hydroxide at 80° C. for 1 week, it showed a weight decrease as small as less than 0.5% and a dimensional change as small as less than 1%, and exhibited a high alkali resistance. The film had a breaking strength of 32 kg/cm² and a breaking elongation of 390%, and exhibited sufficient mechanical strength and flexibility. The heat shrinkages of the film after dipped in an aqueous solution of potassium hydroxide at 105° C. for 30 minutes were 2.4% in a longitudinal direction, 1.1% in a lateral direction and 0.6% in a thicknesswise direction.

EXAMPLE 2

A porous film was prepared in substantially the same manner as described in Example 1 except that SUNTEC B-180 P [trade name of polyethylene manufactured and sold by Asahi Kasei Kogyo Kabushiki Kaisha, Japan ($\overline{M}w = 250,000$, $\overline{M}n = 17,000$, SLMI = 0.03)] was used in place of SUNTEC S-360 P. The shrinkages of the film due to the extraction of DOP were 1.8% in a longitudinal direction (direction of extrusion), 1.2% in a lateral direction and 1.0% in a thicknesswise direction. The shrinkages of the film due to the extraction of the finely divided silica were 4.5% in a longitudinal direction, 2.1% in a lateral direction and 1.6% in a thicknesswise direction. Each of the amounts of DOP and the finely divided silica remaining unextracted from the film was less than 0.5 volume percent based on the film.

The porous film thus obtained had a thickness of 52μ, a porosity of 66%, an average pore diameter of 0.08μ, a maximum pore diameter of 0.15μ and an average ratio of the large dimension to the small dimension of the pores of 1.6. The electrical resistance of the porous film as measured under the same conditions as in Example 1 was 0.00014 $\Omega \text{dm}^2$/sheet (0.00027 $\Omega \text{dm}^2$/0.1 mm). The film had a breaking strength of 70 kg/cm² and a breaking elongation of 350%. The heat shrinkages of the film as measured under the same conditions as in Example 1 were 5.0% in a longitudinal direction, 2.0% in a lateral direction and 1.2% in a thicknesswise direction.

EXAMPLE 3

A polyethylene porous film was prepared in substantially the same manner as described in Example 1 except that tricresyl phosphate [TCP (SP: 9.9)] was used in place of DOP. Each of the amounts of the TCP and the finely divided silica remaining unextracted from the film was less than 0.5 volume percent based on the volume of the film. The shrinkages of the film due to the extraction of TCP were 0.4% in a longitudinal direction (direction of extrusion), 0.3% in a lateral direction and 0.3% in a thicknesswise direction. The shrinkages of the film due to the extraction of the finely divided silica were 0.6% in a longitudinal direction, 0.2% in a lateral direction and 0.2% in a thicknesswise direction.

The porous film thus obtained had a thickness of 0.2 mm, a porosity of 71%, an average pore diameter of 0.46μ, a maximum pore diameter of 0.85μ and an average ratio of the large dimension to the small dimension of the pores of 1.5. The electrical resistance of the porous film as measured under the same conditions as in Example 1 was 0.00016 $\Omega \text{dm}^2$/sheet (0.00008 $\Omega \text{dm}^2$/0.1 mm). The film had a breaking strength of 20 kg/cm$^2$ and a breaking elongation of 102%, and exhibited sufficient mechanical strength and flexibility. The heat shrinkages of the film as measured under the same conditions as in Example 1 were 0.7% in a longitudinal direction, 0.4% in a lateral direction and 0.3% in a thicknesswise direction.

COMPARATIVE EXAMPLE 1

A polyethylene porous film was prepared in substantially the same manner as described in Example 1 except that SUNTEC B-170 P [trade name of polyethylene manufactured and sold by Asahi Kasei Kogyo Kabushiki Kaisha, Japan ($\overline{Mw}$=120,000, $\overline{Mn}$=11,000, SLMI=0.3)] was used in place of SUNTEC S-360 P. The shrinkages of the film due to the extraction of DOP were 1.4% in a longitudinal direction (direction of extrusion), 1.1% in a lateral direction and 0.9% in a thicknesswise direction. The shrinkages of the film due to the extraction of the finely divided silica were 2.3% in a longitudinal direction, 1.9% in a lateral direction and 1.8% in a thicknesswise direction.

The porous film thus obtained had a thickness of 180μ, a porosity of 69%, an average pore diameter of 0.11μ and an average ratio of the large dimension to the small dimension of the pores of 1.2. The electrical resistance of the porous film as measured under the same conditions as in Example 1 was 0.00022 Ωdm$^2$/sheet (0.00012 Ωdm$^2$/0.1 mm). The film had a breaking strength of 19 kg/cm$^2$ and a small breaking elongation of 24%, and the film was brittle and showed insufficient flexibility. The heat shrinkages of the film as measured under the same conditions as in Example 1 were 3.5% in a longitudinal direction, 2.0% in a lateral direction and 1.6% in a thicknesswise direction.

COMPARATIVE EXAMPLE 2

A polyethylene porous film was prepared in substantially the same manner as described in Example 1 except that 15 volume percent of a polyethylene [$\overline{Mw}$=330,000, $\overline{Mn}$=20,000, SLMI=0] was used in place of 25.6 volume percent of SUNTEC S-360 P, 15 volume percent of NIPSIL VN-3 was used in place of 13.6 volume percent of the same and 70 volume percent of SONIC R-200 [trade name of a naphthene process oil manufactured and sold by Kyodo Sekiyu K.K., Japan (SP: 7.9)] was used in place of 60.8 volume percent of DOP. The porous film thus obtained had the shrinkages of 27% in a longitudinal direction (direction of extrusion) and 21% in the lateral direction, and had extremely uneven surfaces. Although the film had a high porosity of 58%, the electrical resistance of the porous film as measured under the same conditions as in Example 1 was unfavorably as high as 0.0021 Ωdm$^2$/sheet (0.00089 Ωdm$^2$/0.1 mm).

The average pore diameter in the film was as small as less than 0.05μ and, hence, the pores could not be observed through an electron microscope.

EXAMPLE 4

A polypropylene porous film was prepared in substantially the same manner as described in Example 1 except that 27 volume percent of NOBLEN W 101 [trade name of polypropylene manufactured and sold by Sumitomo Kagaku K.K., Japan (Mw=250,000, Mn=38,000, SLMI=8)] was used in place of 25.6 volume percent of SUNTEC S-360 P, 13 volume percent of NIPSIL VN-3 was used in place of 13.6 volume percent of the same and 60 volume percent of dibutyl phthalate [DBP (SP: 9.4)] was used in place of 60.8 volume percent of DOP.

Each of the amounts of the DBP and the finely divided silica remaining unextracted from the film was less than 0.5 volume percent based on the volume of the film. The shrinkages of the film due to the extraction of DBP were 1.6% in a longitudinal direction, 1.4% in a lateral direction and 1.5% in a thicknesswise direction. The shrinkages of the film due to the extraction of the finely divided silica were 1.1% in a longitudinal direction, 1.3% in a lateral direction and 2.1% in a thicknesswise direction.

The polypropylene porous film thus obtained had a thickness of 180μ, a porosity of 73%, an average pore diameter of 0.22μ and an average ratio of the large dimension to the small dimension of the pores of 1.2. The electrical resistance of the porous film as measured under the same conditions as in Example 1 was 0.00016 Ωdm$^2$/sheet (0.00009 Ωdm$^2$/0.1 mm). The film had a breaking strength of 26 kg/cm$^2$ and a breaking elongation of 120%, and exhibited sufficient mechanical strength and flexibility. The heat shrinkages of the film as measured under the same conditions as in Example 1 were 0.8% in a longitudinal direction, 0.7% in a lateral direction and 0.4% in a thicknesswise direction.

EXAMPLE 5

A polyethylene porous film was prepared in substantially the same manner as described in Example 1 except that 16 volume percent of NIPSIL VN-3 was used in place of 13.6 volume percent of the same, 16 volume percent of SUNTEC B-180 P was used in place of 25.6 volume percent of SUNTEC S-360 P and 68 volume percent of DOP was used in place of 60 volume percent of the same. The shrinkages of the film due to the extraction of DOP were 0.6% in a longitudinal direction, 0.5% in a lateral direction and 0.5% in a thicknesswise direction. The shrinkages of the film due to the extraction of the finely divided silica were 1.8% in a longitudinal direction, 1.3% in a lateral direction and 1.2% in a thicknesswise direction. Each of the amounts of DOP and the finely divided silica remaining unextracted from the film was less than 0.5 volume percent based on the film.

The porous film thus obtained had a thickness of 0.30 mm, a porosity of 80%, an average pore diameter of 0.09μ, and an average ratio of the large dimension to the small dimension of the pores of 1.3. The electrical resistance of the porous film as measured under the same conditions as in Example 1 was 0.00015 Ωdm$^2$/sheet (0.00005 Ωdm$^2$/0.1 mm). The film had a breaking strength of 18 kg/cm$^2$ and a breaking elongation of 90%, and had an excellent mechanical strength. The heat shrinkages of the film as measured under the same conditions as in Example 1 were 3.3% in a longitudinal direction, 1.8% in a lateral direction and 1.5% in a thicknesswise direction.

EXAMPLE 6

A polyethylene porous film was prepared in substantially the same manner as described in Example 1 except that 18 volume percent of NIPSIL VN-3 was used in place of 13.6 volume percent of the same, 45 volume percent of SUNTEC S-360 P was used in place of 25.6 volume percent of the same and 37 volume percent of DOP was used in place of 60 volume percent of the same. The shrinkages of the film due to the extraction of DOP were 1.1% in a longitudinal direction, 0.9% in a lateral direction and 0.9% in a thicknesswise direction. The shrinkages of the film due to the extraction of the finely divided silica were 3.9% in a longitudinal direction, 2.1% in a lateral direction and 1.7% in a thicknesswise direction. Each of the amounts of DOP and the finely divided silica remaining unextracted from the film was less than 0.5 volume percent based on the film.

The porous film thus obtained had a thickness of 0.08 mm, a porosity of 50%, an average pore diameter of 0.10μ, and an average ratio of the large dimension to the small dimension of the pores of 1.5. The electrical resistance of the porous film as measured under the same conditions as in Example 1 was 0.0004 Ωdm²/sheet (0.0005 Ωdm²/0.1 mm). The film had a breaking strength of 67 kg/cm² and a breaking elongation of 470%. The heat shrinkages of the film as measured under the same conditions as in Example 1 were 4.3% in a longitudinal direction, 2.8% in a lateral direction and 2.2% in a thicknesswise direction.

EXAMPLE 7

A polyethylene porous film was prepared in substantially the same manner as described in Example 1 except that 30 volume percent of Hakuenka O [trade name of calcium carbonate manufactured and sold by Shiraishi Kogyo K.K., Japan (average particle diameter: 30 mμ, specific surface area: 87 m²/g)] was used in place of 13.6 volume percent of NIPSIL VN-3, 40 volume percent of DOP was used in place of 60.8 volume percent of the same, 30 volume percent of SUNTEC S-360 P was used in place of 25.6 volume percent of the same and the extraction of calcium carbonate was carried out by immersing the film in a 20% aqueous solution of hydrochloric acid for 1 hour. The shrinkages of the film due to the extraction of DOP were 1.8% in a longitudinal direction (direction of extrusion), 1.6% in a lateral direction and 0.9% in a thicknesswise direction. The shrinkages of the film due to the extraction of calcium carbonate were 2.6% in a longitudinal direction, 2.3% in a lateral direction and 1.8% in a thicknesswise direction. Each of the amounts of DOP and calcium carbonate remaining unextracted from the film was less than 0.5 volume percent based on the film.

The porous film thus obtained had a thickness of 260μ, a porosity of 56%, an average pore diameter of 0.25μ, and an average ratio of the large dimension to the small dimension of the pores of 1.5. The electrical resistance of the porous film as measured under the same conditions as in Example 1 was 0.00075Ω dm²/sheet (0.00029Ω dm²/0.1 mm). The film had a breaking strength of 33 kg/cm² and a breaking elongation of 85%, and had a sufficient flexibility. The heat shrinkages of the film as measured under the same conditions as in Example 1 were 1.5% in a longitudinal direction, 1.2% in a lateral direction and 0.9% in a thicknesswise direction.

EXAMPLE 8

A polyethylene porous film was prepared in substantially the same manner as described in Example 1 except that tributyl phosphate [TBP (SP:8.6)] was used in place of DOP. The shrinkages of the film due to the extraction of TBP were 2.2% in a longitudinal direction, 1.8% in a lateral direction and 1.6% in a thicknesswise direction. The shrinkages of the film due to the extraction of the finely divided silica were 6.6% in a longitudinal direction, 5.8% in a lateral direction and 5.2% in a thicknesswise direction. Each of the amounts of TBP and the finely divided silica remaining unextracted from the film was less than 0.5 volume percent based on the film.

The porous film thus obtained had a thickness of 0.12 mm, a porosity of 62%, an average pore diameter of 0.11μ, and an average ratio of the large dimension to the small dimension of the pores of 1.4. The electrical resistance of the porous film as measured under the same conditions as in Example 1 was 0.00022Ω dm²/sheet (0.00018Ω dm²/0.1 mm). The film had a breaking strength of 28 kg/cm² and a breaking elongation of 240%. The heat shrinkages of the film as measured under the same conditions as in Example 1 were 5.8% in a longitudinal direction, 5.3% in a lateral direction and 5.0% in a thicknesswise direction.

COMPARATIVE EXAMPLE 3

A polyethylene porous film was prepared in substantially the same manner as described in Example 1 except that SUNTEC B-180 P was used in place of SUNTEC S-360 P and dioctyl sebacate [DOS (SP:8.4)] was used as the organic liquid in place of DOP. The shrinkages of the film due to the extraction of DOS were 2.4% in a longitudinal direction, 2.2% in a lateral direction and 1.8% in a thicknesswise direction. The shrinkages of the film due to the extraction of the finely divided silica were as large as 12.3% in a longitudinal direction, 10.6% in a lateral direction and 8.8% in a thicknesswise direction. The appearance of the film was poor owing to the uneven shrinkages.

The porous film thus obtained had a thickness of 0.12 mm, a porosity of 49% and an average pore diameter of less than 0.05μ. The electrical resistance of the porous film as measured under the same conditions as in Example 1 was unfavorably as high as 0.00074Ω dm²/sheet (0.00062Ω dm²/0.1 mm). The film had a breaking strength of 36 kg/cm² *and a breaking elongation of* 270%. The heat shrinkages of the film as measured under the same conditions as in Example 1 were 6.8% in a longitudinal direction, 6.4% in a lateral direction and 5.7% in a thicknesswise direction.

COMPARATIVE EXAMPLE 4

A polyethylene porous film was prepared in substantially the same manner as described in Comparative Example 3 except that SONIC R-200 [a naphthene process oil (SP:7.9)] was used in place of DOS. The shrinkages of the film due to the extraction of the process oil were 2.5% in a longitudinal direction, 2.2% in a lateral direction and 2.0% in a thicknesswise direction. The shrinkages of the film due to the extraction of the finely divided silica were 17.9% in a longitudinal direction, 16.8% in a lateral direction, and 12.8% in a thicknesswise direction. The film had a poor appearance.

The porous film thus obtained had a thickness of 0.18 mm. The porosity of the film was 38% and rather low as compared with the porosity of 50% before the extraction of the finely divided silica. The average pore diameter in the film was less than 0.05μ. The electrical resistance of the porous film as measured under the same conditions as in Example 1 was unfavorably as extremely high as 0.0036Ω dm²/sheet (0.0020Ω dm²/0.1 mm). The film had a breaking strength of 45 kg/cm² and a breaking elongation of 330%. The heat shrinkages of the film as measured under the same conditions as in Example 1 were 4.8% in a longitudinal direction, 4.3% in a lateral direction and 4.1% in a thicknesswise direction.

EXAMPLE 9

A polyethylene porous film was prepared in substantially the same manner as described in Example 1 except that a blended polyethylene ($\overline{M}w=290,000$, $\overline{M}n=20,000$) obtained by blending a polyethylene ($\overline{M}w=330,000$, $\overline{M}n=20,000$, SLMI=0) and a polyethylene ($\overline{M}w=85,000$, $\overline{M}n=21,000$, SLMI=0) was used in place of SUNTEC S-360 P. The shrinkages of the film due to the extraction of DOP were 2.5% in a longitudinal direction, 2.1% in a lateral direction and 1.9% in a thicknesswise direction. The shrinkages of the film due to the extraction of the finely divided silica were 6.7% in a longitudinal direction, 4.8% in a lateral direction, and 5.3% in a thicknesswise direction. Each of the amounts of DOP and the finely divided silica remaining unextracted from the film was less than 0.5 volume percent based on the film.

The porous film thus obtained had a thickness of 0.025 mm, a porosity of 62%, an average pore diameter of $0.05\mu$ and an average ratio of the large dimension to the small dimension of the pores of 2.0. The electrical resistance of the porous film as measured under the same conditions as in Example 1 was as extremely low as $0.0001\Omega$ dm²/sheet ($0.00038\Omega$ dm²/0.1 mm). The film had a breaking strength of 66 kg/cm² and a breaking elongation of 170%. The heat shrinkages of the film as measured under the same conditions as in Example 1 were 6.0% in a longitudinal direction, 2.5% in a lateral direction and 2.3% in a thicknesswise direction.

COMPARATIVE EXAMPLE 5

A polyethylene porous film was prepared in substantially the same manner as described in Example 1 except that dimethyl phthalate [DMP (SP:10.5)] was used as the organic liquid in place of DOP. The shrinkages of the film due to the extraction of DMP were 0.3% in a longitudinal direction, 0.1% in a lateral direction and 0.1% in a thicknesswise direction. The shrinkages of the film due to the extraction of the finely divided silica were 0.3% in a longitudinal direction, 0.3% in a lateral direction and 0.4% in a thicknesswise direction.

The porous film thus obtained had a thickness of 0.27 mm, a porosity of 77%, an average pore diameter of $0.62\mu$ and an average ratio of the large dimension to the small dimension of the pores of 1.3. The pores were large and non-uniform. Although the electrical resistance of the porous film as measured under the same conditions as in Example 1 was as excellent as $0.00022\Omega$ dm²/sheet ($0.00008\Omega$ dm²/0.1 mm), the film had a breaking strength of 16 kg/cm² and a small breaking elongation of 26%, and the film was weak and brittle. The heat shrinkages of the film as measured under the same conditions as in Example 1 were 1.1% in a longitudinal direction, 0.7% in a lateral direction and 0.6% in a thicknesswise direction.

COMPARATIVE EXAMPLE 6

A polyethylene porous film was prepared in substantially the same manner as described in Example 1 except that HIZEX MILLION 145 M [trade name of polyethylene manufactured and sold by Mitsui Sekiyukagaku K.K., Japan ($\overline{M}v=600,000$, SLMI=0)] was used in place of SUNTEC S-360 P. The shrinkages of the film due to the extraction of DOP were 2.8% in a longitudinal direction (direction of extrusion), 2.2% in a lateral direction and 1.8% in a thicknesswise direction. The shrinkages of the film due to the extraction of the finely divided silica were 7.2% in a longitudinal direction, 6.3% in a lateral direction and 5.6% in a thicknesswise direction. Each of the amounts of DOP and the finely divided silica remaining unextracted from the film was less than 0.5 volume percent based on the film.

The porous film thus obtained had a thickness of 0.28 mm and a porosity of 60%. The average pore diameter in the film was as small as less than $0.05\mu$ and, hence, the pores could not be observed through an electron microscope. Although the porosity of the film was as high as 60%, the electrical resistance of the porous film as measured under the same conditions as in Example 1 was as high as $0.0018\Omega$ dm²/sheet ($0.00066\Omega$ dm²/0.1 mm) owing to the small pore diameters and small opening areas of the pores. The film had a breaking strength of 88 kg/cm² and a breaking elongation of 220%. The heat shrinkages of the film as measured under the same conditions as in Example 1 were 6.7% in a longitudinal direction, 3.9% in a lateral direction and 3.6% in a thicknesswise direction.

What is claimed is:

1. An alkaline battery separator made of a porous film which consists substantially of a polyolefin having a weight average molecular weight of less than 300,000 and a number average molecular weight of 15,000 or more and which has a thickness of 0.025 to 1 mm, a porosity of 50 to 80%, an average pore diameter of 0.05 to $0.5\mu$, an average ratio of the larger dimension to the smaller dimension of the pore opening of not more than 2 and an electrical resistance of 0.00005 to $0.0005\Omega$ dm²/0.1 mm.

2. An alkaline battery separator according to claim 1, wherein said polyolefin has a weight average molecular weight of 250,000 or less.

3. An alkaline battery separator according to claim 2, said polyolefin has a weight average molecular weight of 85,000 to 250,000.

4. An alkaline battery separator according to claim 1, wherein said polyolefin has a number average molecular weight of 17,000 or more.

5. An alkaline battery separator according to claim 4, wherein said polyolefin has a number average molecular weight of 17,000 to 50,000.

6. An alkaline battery separator according to claim 1, wherein said thickness is 0.03 to 0.3 mm.

7. An alkaline battery separator according to claim 1, wherein said porosity is 55 to 75%.

8. An alkaline battery separator according to claim 1, wherein said average pore diameter is 0.08 to $0.3\mu$.

9. An alkaline battery separator according to claim 1, wherein said average ratio of the larger dimension to the smaller dimension of the pore opening is not more than 1.5.

10. An alkaline battery separator according to claim 1, wherein said polyolefin is an olefin homopolymer.

11. An alkaline battery separator according to claim 1, wherein said polyolefin is an olefin copolymer.

12. An alkaline battery separator according to claim 10, wherein said polyolefin is polyethylene.

13. An alkaline battery separator according to claim 11, wherein said polyolefin is an ethylene copolymer.

14. An alkaline battery separator according to claim 13, wherein said ethylene copolymer is a copolymer of ethylene with at least one member selected from the group consisting of propylene, butene and hexene.

15. An alkaline battery separator according to claim 13, wherein aid ethylene copolymer is a copolymer of ethylene as a main component with other olefin.

16. An alkaline battery separator according to claim 1, wherein said porous film shows a heat shrinkage of not more than 6% after it has been immersed in an aqueous potassium hydroxide solution having a specific gravity of 1.3 at 105° C. for 30 minutes.

17. A method of producing an alkaline battery separator made of a porous film which comprises blending a polyolefin having a weight average molecular weight of less than 300,000 and a number average molecular weight of 15,000 or more, an inorganic filler, and an organic liquid having a solubility parameter ranging from 8.6 to 9.9 inclusive in amounts of 10 to 50 volume percent, 7 to 42 volume percent, and 30 to 75 volume percent, respectively, based on the whole volume of the polyolefin-filler-organic liquid composition, the amount of the polyolefin being $\frac{2}{3}$ to 9 multiple of the amount of the inorganic filler; subjecting the resulting blend to melt-molding to form a film; and extracting from said film the organic liquid and the inorganic filler.

18. A method according to claim 17, wherein said polyolefin has a weight average molecular weight of 250,000 or less.

19. A method according to claim 18, said polyolefin has a weight average molecular weight of 85,000 to 250,000.

20. A method according to claim 17, wherein said polyolefin has a number average molecular weight of 17,000 or more.

21. A method according to claim 20, wherein said polyolefin has a number average molecular weight of 17,000 to 50,000.

22. A method according to claim 17, wherein said polyolefin is an olefin homopolymer.

23. A method according to claim 17, wherein said polyolefin is an olefin copolymer.

24. A method according to claim 22, wherein said polyolefin is polyethylene.

25. A method according to claim 23, wherein said polyolefin is an ethylene copolymer.

26. A method according to claim 25, wherein said ethylene copolymer is a copolymer of ethylene with at least one member selected from the group consisting of propylene, butene and hexene.

27. A method according to claim 25, wherein said ethylene copolymer is a copolymer of ethylene as a main component with other olefin.

28. A method according to claim 17, wherein said solubility parameter of the organic liquid is 8.7 to 9.4.

29. A method according to claim 17, wherein said organic liquid is dioctyl phthalate.

30. A method according to claim 17, wherein said inorganic filler has an average particle size of 0.005 to 0.5μ.

31. A method according to claim 17, wherein said inorganic filler has a surface area of 50 to 500 m²/g.

32. A method according to claim 17, wherein said inorganic filler is silica.

33. A method of producing an alkaline battery separator made of a porous film which comprises extracting the inorganic filler from a microporous film comprising 40 to 88 volume percent of a polyolefin having a weight average molecular weight of less than 300,000 and a number average molecular weight of 15,000 or more and 60 to 12 volume percent of an inorganic filler and having a void space rate of 30 to 75 volume percent based on the volume of the film.

34. A method according to claim 33, wherein the volume percent of the polyolefin is 50 to 80.

35. A method according to claim 33, wherein the volume percent of the inorganic filler is 50 to 20.

36. A method according to claim 33, wherein the volume percent of the void space rate is 45 to 65.

* * * * *